United States Patent [19]

Funaki

[11] Patent Number: 5,268,997
[45] Date of Patent: Dec. 7, 1993

[54] COMPUTER GRAPHIC SYSTEM FOR DETECTING INTERFERENCE BETWEEN ADJACENT GRAPHIC ELEMENTS

[75] Inventor: Shigeo Funaki, Kawasaki, Japan
[73] Assignee: Fujitsu Limited, Japan
[21] Appl. No.: 742,919
[22] Filed: Aug. 9, 1991

[30] Foreign Application Priority Data

Aug. 10, 1990 [JP] Japan ................... 2-212422

[51] Int. Cl.⁵ .......................... G06F 15/62
[52] U.S. Cl. .................... 395/127; 395/119; 395/120; 395/155
[58] Field of Search ......... 395/102, 118–121, 395/123, 127, 133–136, 155

[56] References Cited

U.S. PATENT DOCUMENTS 4,668,963 5/1987 Tanabe et al. ............... 395/102 X
4,992,962 2/1991 Ishida et al. ................. 395/123 X
5,006,991 4/1991 Ohcoshi et al. .............. 395/120 X

FOREIGN PATENT DOCUMENTS

2-189685 7/1990 Japan.
2-219179 8/1990 Japan.

Primary Examiner—Heather R. Herndon
Assistant Examiner—Almis Jankus
Attorney, Agent, or Firm—Welsh & Katz, Ltd.

[57] ABSTRACT

A system for determining the arrangement of graphic segments or elements in a computer graphics and includes an input unit for entering the desired position and orientation of each individual graphic segment representative of a component or part of a product to be designed. The system also has an interference checking unit for checking interference of newly entered graphic segments relative to other segments already fixed in arrangement. The interference checking unit generates an alarm indicating the occurrence of interference through an interference alarming unit.

20 Claims, 5 Drawing Sheets

COMPUTER GRAPHIC SYSTEM FOR DETECTING INTERFERENCE BETWEEN ADJACENT GRAPHIC ELEMENTS

BACKGROUND OF THE INVENTION

1. Field of the Invention

The present invention relates generally to a system for determining the arrangement of graphic segments or elements in computer graphic systems. More specifically, the invention relates to computer graphic systems capable of detecting interference between adjacent graphic elements or segments in a computer aided graphic system, such as a computer aided designing (CAD) system.

2. Description of the Related Art

In modern industry, there is a trend to employ CAD systems for designing new products because of ease of application of computer aided manufacturing (CAM) or numerical control on production lines. For this, various CAD systems have been developed and introduced into the market.

The CAD system permits a designer to work on computer graphics for determining positions and orientations of components or parts of the products as well as dimensions, configurations and so forth, on a graphic display screen. To enable this, graphic symbols, graphic images and so forth representing respective components or parts are arranged in a two-dimensional or three-dimensional coordinate system on a computer display monitor. Such graphic representations of the components or parts of the product will be hereafter referred to as "graphic elements" or "graphic segments". Also, it should be noted that the term "interference" throughout the disclosure represents not only mechanical interference, such as collision and blocking of motion of the components or parts, but also electrical or magnetic interference affecting the operation of neighboring components or parts.

In such CAD technologies, it is necessary to avoid interference between graphic elements or segments so that interference between components or parts may not be imparted to the actual products. Avoidance of interference of components or parts of the actual products at the CAD stage may eliminate the necessity of re-designing after trial production, which otherwise requires redundant work in the design center and prototype center in the industry.

In the prior proposed or developed CAD systems, checks for interference of the components or parts are performed after completing arrangement of all necessary graphic segments in the CAD system. This enables the designer to discern the occurrence of interference of the components or parts in the design before the design is transferred to the prototype center thus avoiding the necessity of re-designing following discovery of interference in the prototype at the prototype stage. Therefore, designing efficiency can be improved by detecting potential interferences at the computer model stage.

On the other hand, however, once interference between components or parts is found at the checking stage in the CAD system, the designer has to re-arrange the graphic segments representing the interfering components or parts of the product. Re-arrangement of one graphic segment often creates additional interference with other components or parts and can result in the necessity for a re-arrangement of various graphic segments. Especially, when the product has a complex construction in which a plurality of parts are arranged at high density, re-arrangement of one graphic segment can affect many other segments and may require troublesome re-arrangement thus increasing the time required for designing. Furthermore, when interference occurs at a plurality of graphic segments, a complex and difficult re-arrangement of various graphic segments becomes necessary thus degrading the workability of the product. This clearly reduces the efficiency of designing.

SUMMARY OF THE INVENTION

In view of the drawbacks in the prior art, it is an object of the present invention to provide a computer graphics system that can solve the drawbacks in the prior art and can provide improved designing efficiency.

Another and more specific object of the present invention is to provide computer graphics technology that enables interference detection between graphic segments during the determination of the position and orientation of each individual graphic segment.

A further object of the invention is to provide a computer graphics technology which can detect not only direct interference between adjacent graphic segments but also indirect interference of the components in a finished product during operation.

In order to accomplish the afore-mentioned and other objects, a system for determining the arrangement of graphic segments or elements in computer graphics, according to the present invention, includes an input means for entering a desired position and the orientation of each individual graphic segment representative of a component or part of a product to be designed. The system also has an interference checking means that checks interference of the newly entered graphic segment relative to other segments already fixed in the arrangement. The interference checking means generates an alarm indicating occurrence of interference through an interference alarming means.

According to one aspect of the invention, a system for arranging graphic segments and avoiding interference between the adjacent segments in computer graphics, includes:

first means for entering position data of a graphic segment of known configuration and known dimension in a computer graphics coordinate system;

second means for defining a predetermined interference condition with respect to each individual graphic segment;

third means for checking interference of adjacent graphic segments and producing an interfering condition indicative signal when the interference condition is satisfied; and fourth means, responsive to the interfering condition indicative signal for generating an alarm during an interfering condition.

In the preferred construction, the second means includes a storage means for storing interference condition data for each graphic segment with identification of the associated segment so that the interference condition data can be read out in terms of the identification data of the associated graphic segment for which interference is to be checked. Also, it is preferred that the system further comprises fifth means which stores data associated with each graphic segment, the stored data including the predetermined interference condition set therefor. Furthermore, the second means may define minimum spacing between adjacent graphic segments as the predetermined interference condition. Preferably, the second means defines an interference area around the corresponding graphic segments so that the interfering condition is detected by overlapping between adjacent interference areas of the adjacent graphic segments. In the alternative, the second means defines a minimum distance between borders of adjacent graphic segments.

On the other hand, the fourth means provides an alarm by visually displaying an interfering condition on a display screen together with the graphic segments. Alternatively, the fourth means generates an audible alarm.

According to another aspect of the invention, a system for arranging graphic segments representative of components or parts of a product to be designed by avoiding the occurrence of interference between the adjacent components or operating parts of the actual product, in a computer graphics, includes:

first means for entering position data of a graphic segment of known configuration and dimension, in a computer graphics coordinate system;

second means for defining a predetermined interference condition with respect to each individual graphic segment in view of the intended operation of the corresponding component or parts;

third means for checking for interference in adjacent graphic segments and producing an interfering condition indicative signal when the interference condition is satisfied; and fourth means, responsive to the interfering condition indicative signal, for generating an alarm during an interfering condition.

According to a further aspect of the invention, in a computer graphic system for arranging graphic segments representative of components or parts of a product to be designed by avoiding the occurrence of interference between the adjacent components or parts during operation of the actual product, a process for arranging the graphic segments comprises the steps of:

entering position data of a graphic segment of known configuration and known dimension in a computer graphics coordinate system;

defining a predetermined positional relationship of each individual graphic segment relative to the neighborhood graphic segments in view of the operation of the corresponding components or parts;

checking the positional relationship between graphic segments and producing an interfering condition indicative signal when the positional relationship of adjacent graphic segments out of the predetermined positional relationship is detected;

generating an alarm during an interfering condition and requiring the re-arrangement of at least one graphic segment.

The processing should be performed periodically with a substantially short intervals. Further preferably, the alarm should be provided with information about interfering conditions between the graphic segments.

BRIEF DESCRIPTION OF THE DRAWINGS

The present invention can be more fully understood from the detailed description given herebelow and from the accompanying drawings of the preferred embodiment of the invention, which, however, should not limit the invention to the specific embodiment but are for the purpose of explanation and illustration only.

In the drawings.

DESCRIPTION OF THE PREFERRED EMBODIMENT

Figure 1:
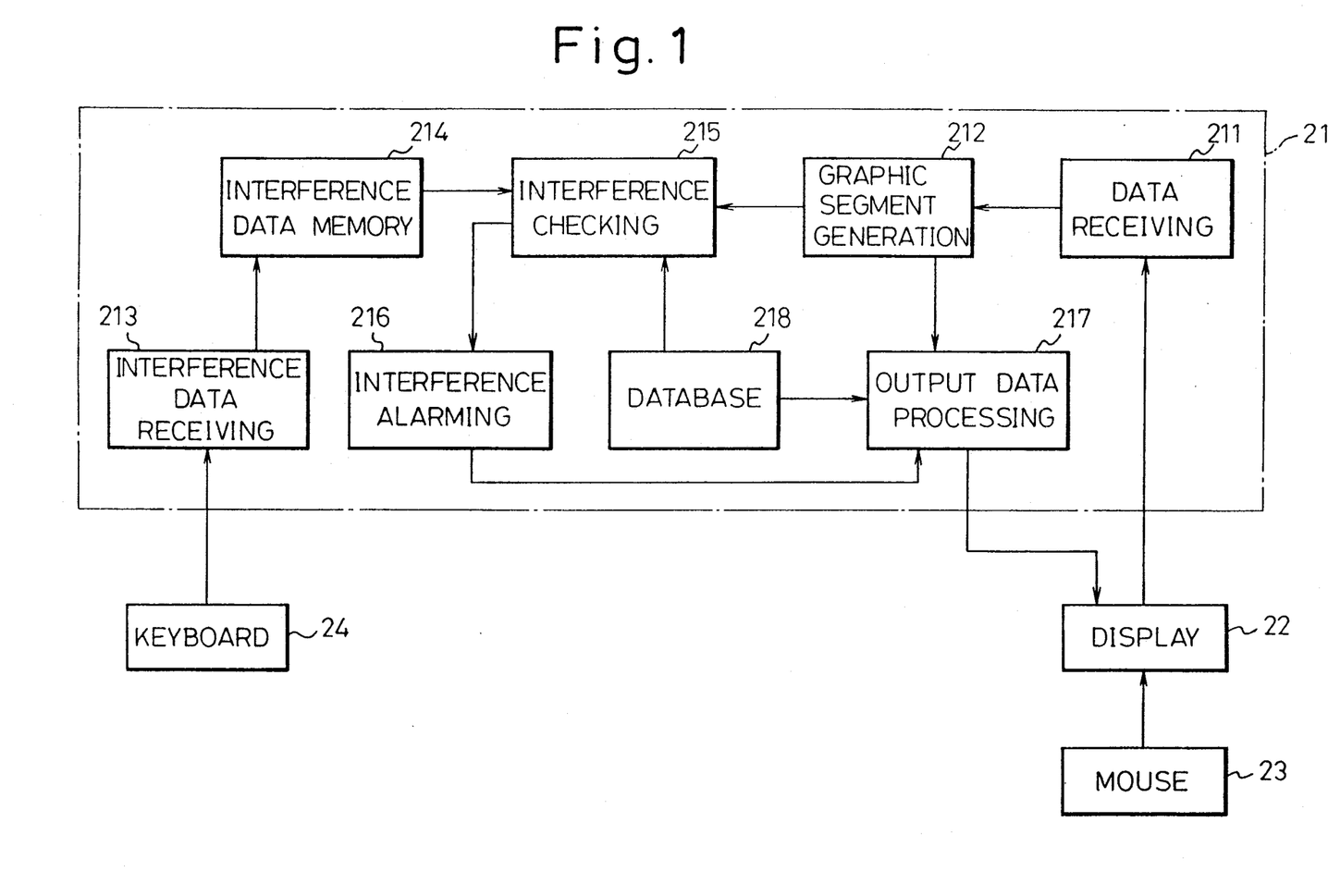
FIG. 1 is a schematic block diagram of the preferred embodiment of a computer graphics system illustrated in a discrete manner.

With reference to the drawings, particularly to FIG. 1, the preferred embodiment of a computer graphics system, according to the present invention is illustrated in a form of CAD system for performing the designing of products on a two- or three-dimensional computer coordinate system. The CAD system includes a data processing unit 21 that may comprise a computer. It should be appreciated that some of the illustrated components in the data processing unit 21 may be realized by software and executed by the processing unit. The data processing unit 21 is connected to a graphic display unit 22 that has a graphic coordinate system corresponding to the computer coordinate system for displaying image, data, figure and other information. An appropriate interface and/or graphic driver may be provided for the computer system for enabling the graphic display of the necessary information. A mouse 23 is also provided for moving a displayed image or other information on the display coordinate system. The mouse 23 can also be used for entry of command or data, such as a segment entry completion command or signal. The illustration in FIG. 1 concerning connection of the mouse 23 is explanatory. The mouse 23 can be connected in the known manner for the entry of data including movement of cursor, click command and so forth. A keyboard 24 is also provided for entry of data, such as command data, numerical data, interference condition data and so forth. The mouse 23 and the keyboard 24 in the shown embodiment form input means for enabling a designer to access the data processing unit 21 and thus enter data including interference data of each individual graphic segment. The data of the graphic segment may include data representative of identification of the graphic segment, configuration and/or dimension of the graphic segment and position and/or orientation of the graphic segment on the graphic coordinate system. Such data associated with each individual graphic segment will be hereafter referred to as "segment design data". With respect to each individual graphic segment, there is also provided interference data which represents minimum spacing required for arranging the graphic segment without causing interference on the corresponding component or part of the product with other components or parts during the operation. Therefore, the interference data may be variable depending upon the nature and intended operation of the component or part represented by the graphic segment. The data associated with the graphic segment including the segment design data and the interference data will be hereafter referred to as "segment data".

It should be appreciated that though the shown embodiment employs the mouse 23 and the keyboard 24 as the input means, it may be possible to employ any appropriate data entry means, such as light pen, touch panel and so forth. Also, though the shown embodiment will be discussed in terms of the embodiment such that the segment design data is entered only through the mouse 23, it is of course possible to enter the same data or part of the segment design data through the keyboard in a known manner, as desired.

In the practical segment design data entry operation, the mouse 23 may be operated for selection of the graphic segment to be arranged from a pre-set segment storage database. The segment storage database may be set according to an associated standard of the product to be designed and thus includes information concerning configuration, dimension and cursor position or positions. By selecting one of the pre-stored graphic segments, the image of the selected graphic segment is displayed on the display screen of the graphic display unit 22 in an overlying fashion. Then, the cursor may be positioned at one of the cursor positions on the displayed image of the graphic segment. At this time, the cursor may be movable on the displayed image between the predetermined cursor positions. Under this condition, through the mouse, a cursor motion command may be entered by clicking the mouse at the desired cursor. Then, the image can be gripped at the cursor position at the time of entry of the cursor motion command. It then becomes possible to move the image of the graphic segment on the display screen by observing the positional relationship with the already arranged graphic segments. During movement, the coordinate data of respective cursor points may be continuously or periodically updated. At the designed position, the image position fixing command is entered through the mouse 23 for fixing the coordinate position of the gripped cursor point. In the case that orientation of the graphic segment is to be adjusted, one of the cursor points is identified as a center of rotation of the image with image rotation command. Then, another cursor point is gripped for rotating the image about the cursor point identified as the rotation center. During and according to the rotation of the image, the coordinate data of the cursor points may also be updated continuously or periodically. When the graphic segment is arranged at the desired position with a desired orientation, then an enter completion indicative signal is entered through the mouse 23. Such image entry process is per se well known and thus is not necessary to discuss in further detail.

In the shown embodiment, the processing unit 21 includes an entry data receiving stage 211 that receives input of the segment design data through the mouse 23 and/or the keyboard 24. On the other hand, the data receiving stage 211 is so designed as to periodically provide a data entry demand for enabling reading output of data entered through the mouse 23. Therefore, in the shown embodiment, the segment design data including coordinate position data of the cursor points of the image of the graphic segment can be cyclically updated in the data receiving stage 211.

The segment design data thus received in the data receiving stage 211 are transferred to a graphic segment generating stage 212. The graphic segment generating stage 212 is designed to generate image data of the graphic segment on the basis of the segment design data provided through the data receiving stage 211. The image data may include identification of the addresses of pixels on the display coordinate system associated with the graphic segment newly entered. The image data thus generated are transferred to an interference checking stage 215 and an output data processing stage 217. The output data processing stage 217 is also connected to a database 218 that stores segment design data and image data of respective graphic segments which are already arranged. The data stored in the database 218 may be used as design data of the product to be designed. The image data of respective graphic segments in the database 218 are periodically output to the output data processing stage 217. The output data processing stage 217 superimposes the image data of the newly entered graphic segment from the graphic segment generating state 212 to the image data of the already arranged graphic segments from the database 218 to drive the graphic driver for periodically updating a display image on the display screen of the graphic display unit 22.

On the other hand, the interference data input through the keyboard 24 are read out and received by an interference data receiving stage 213. The interference data receiving stage 213 supplies the interference data to an interference data memory 214. The interference data storage memory 214 stores the interference data with an identification of the associated graphic segment. The interference data thus stored in the interference data storage memory 214 are supplied to the interference checking stage 215.

The interference checking stage 215 is designed to perform an interference checking operation with a substantially short interval during movement of the newly entered graphic segment by the operation of the mouse 23. The interval of the checking operation to be performed by the interference checking stage 215 is set to be short enough to check for interference conditions repeatedly at each position during movement of the graphic segment on the display screen. In order to perform checking, the interference checking stage 215 receives segment design data of respectively arranged graphic segments from the database 218 and associated interference data from the interference data memory 214. Also, the interference checking stage 215 receives the segment design data and the interference data of the newly entered graphic segment from the graphic segment generating stage 212 and the interference data memory 214.

Figure 2:
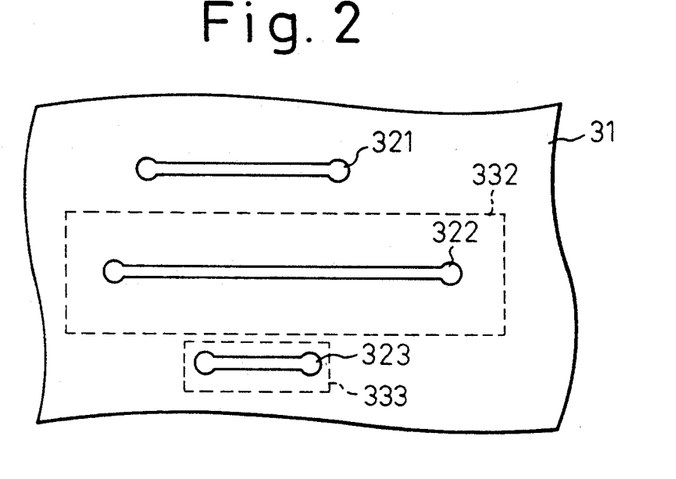
FIGS. 2 to 4 are illustrations showing interference data and a manner of checking for interference and informing of an interference condition in one embodiment of the graphic segments arranging system according to the invention.
Figure 3:
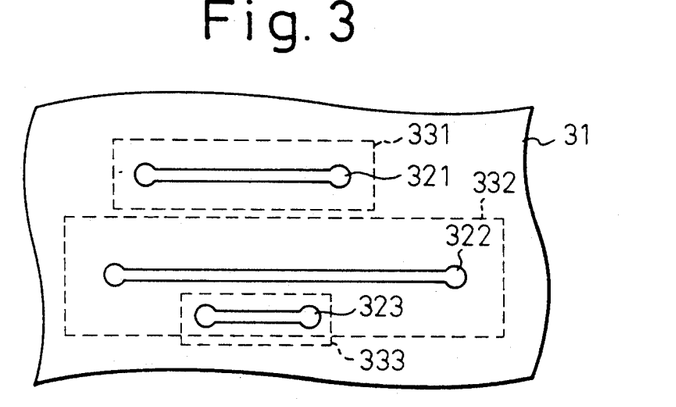
Figure 4:
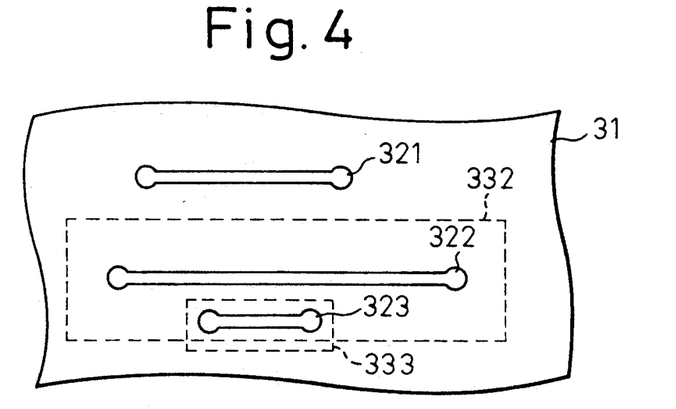

In the interference checking stage 215, a check is performed whether the newly entered graphic element causes interference with the formerly arranged graphic segments or not. In the shown embodiment, the interference data is given as an area data representing required minimum space of the corresponding component or part of the product for performing the desired operation without causing interference with the neighborhood components or parts in the product, as shown in FIG. 2 to 4. In FIGS. 2 to 4, it is assumed that a new graphic segment 323 is entered relative to graphic segments 321 and 322 which are read out from the database 218. As seen, the interference areas 331 and 332 set for the graphic segments 321 and 322 are also read out from the interference data memory 214 for the graphic segments 321 and 322. Similarly, the interference data is read out from the interference data storage memory 214 with respect to the newly entered graphic segment 323. Therefore, an interference area 33 is defined about the graphic segment 323. Checking for interference is performed, in the shown embodiment, by checking for an overlap of the interference area 333 with to the interference areas 331 and 332. When the graphic segment 323 is arranged as shown in FIG. 2, in which the interference area 333 does not overlap with any of the interference areas 331 and 332, it can be determined that there is no interference. In such a case, the segment data of the graphic segment 321 including the segment design data and the interference data are stored in the database 218 as a part of the designed data of the product to be designed. On the other hand, when the arrangement of the graphic segment 323 is as shown in FIG. 3, in which the interference area 333 overlaps with the interference area 332 of the graphic segment 322, then it is determined that there is interference and thus rearrangement of the graphic segment 323 is required. In such a case, an alarm may be activated to indicate the necessity of re-arrangement by an interference alarming section 216. In the shown embodiment, when the interference is detected, the interference checking section 215 feeds identification data of the graphic segment causing interference to the interference alarming section 216. Based on the identification data, the interference alarming section 216 forms alarming data for displaying interfering interference areas on the display screen of the graphic display unit 22. The interference alarming section 216 feeds the alarming data to the output data processing stage 217. The output data processing stage 217 superimposes the interference area images, supplied from the interference alarming stage 216, for an image in which the already arranged segments and the newly entered graphic segments are combined. Therefore, the interference areas 332 and 333 causing interference is visible on the display screen of the graphic display 22, as shown in FIG. 4. This manner of alarming will be convenient for the designer since the display of the interfering areas may offer guidance for the solution of the interference.

Figure 5:
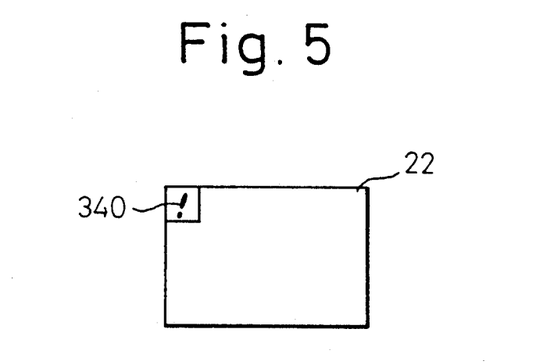
FIG. 5 is an illustration showing another embodiment of a visual alarm to be generated when interference in the graphic segments is detected.

Alarming the designer, can be done in various ways. For example, an alarm can be displayed as an alarm sign 340 on the display screen as shown in FIG. 5. As an alternative, an audible beeping alarm can be activated. An alarm may also be identified with highlighting or a color change of the interfering portion of the graphic segment. Various methods of alarming are applicable individually or in combination.

When interference is determined, the designer will move the image of the graphic segment in a manner identical to the initial entry for re-arrangement. At the end of the movement of the image data, the data entry completion signal is again entered for performing an interference check at the interference checking stage 215.

Figure 6:
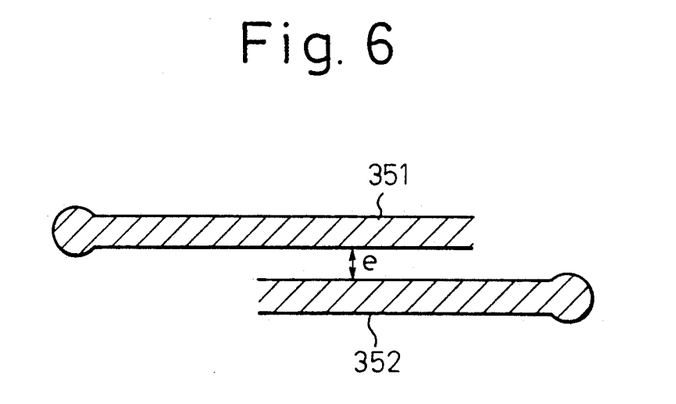
FIG. 6 is an illustration showing another embodiment of alarming of an interference condition.

Although the foregoing discussion is given to provide the interference data an area data defining the minimum area required for arranging the graphic segment without causing interference of motion or operation of the corresponding component or part in the actual product, it may be possible to define the criterion of interference between the adjacent graphic segments. An alternative approach is shown in FIG. 6. In the shown embodiment, the interference criterion is given as a minimum distance l between the adjacent graphic segments 351 and 352. In such a case, interference may be checked by determining the distance between adjacent portions of the outlines of the graphic segments and comparing the determined distance with the interference criterion l.

Practical operation, of the shown embodiment, of the arrangement of the graphic segments will be discussed with reference to the flowchart in FIG. 7. The flowchart in FIG. 7 shows the process for detecting interference of the graphic segments utilizing the area data as the interference data in the embodiment of FIGS. 2 to 4.

Figure 7:
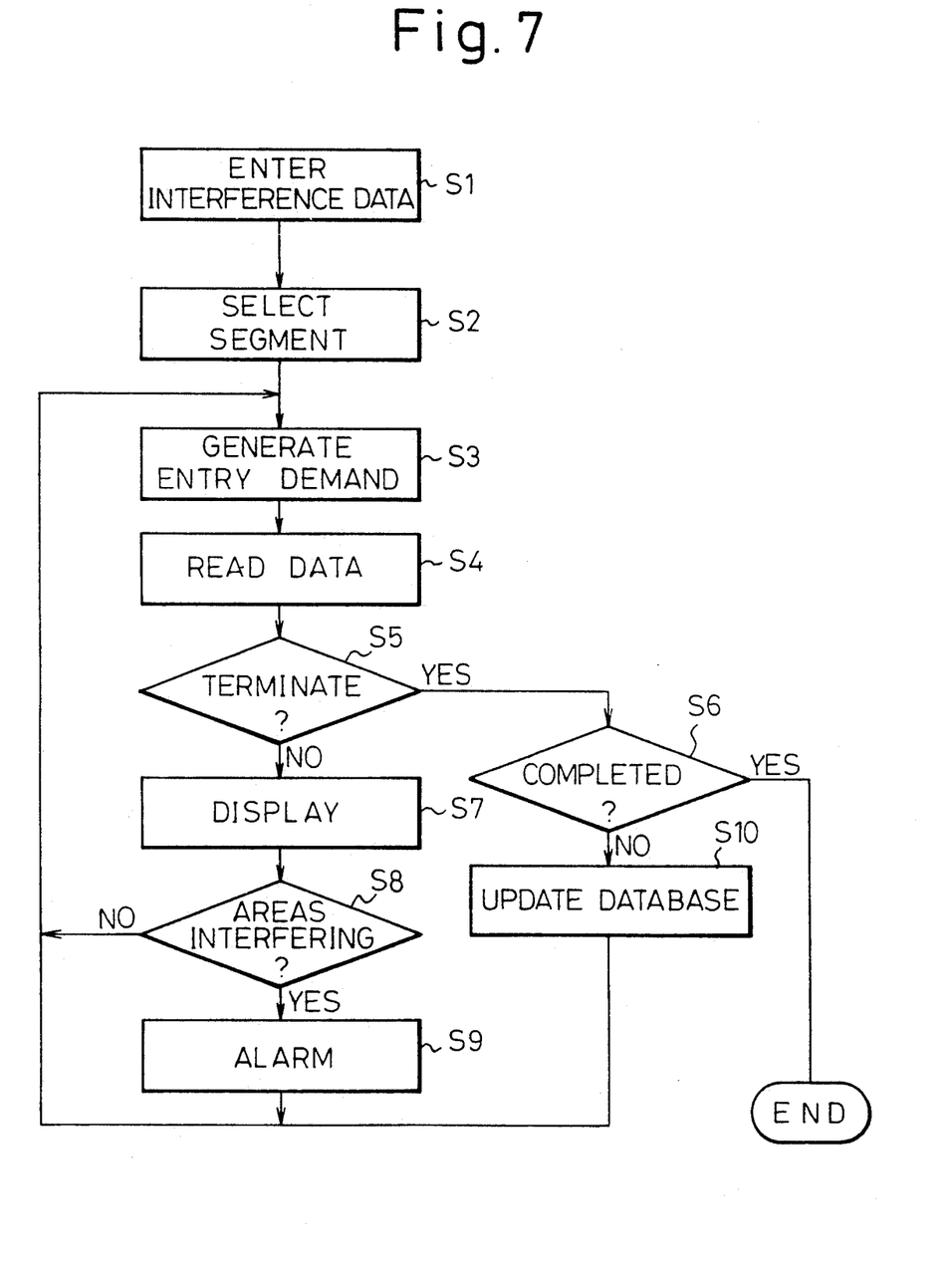
FIG. 7 is a flowchart showing the operation, in one embodiment, of the entry process for orientating each individual graphic segment, in the preferred embodiment of the computer graphic system of FIG. 1.

As can be seen from FIG. 7, at an initial step S1, entry of interference data is performed through the key board 24. At this step S1, all interference data for all graphic segments to be used in design are entered. The interference data may accompany identification data of the corresponding graphic segment, and the identification data may correspond to the identification data of the segment design data of the graphic segment for co-relating the interference data with the corresponding graphic segment. The interference data thus entered are fed to the interference data memory 214 via the interference data receiving stage 213. The interference data memory 214 thus stores the all of the interference data with identification data of the associated segment.

Then, at a step S2, selection is made for the graphic segment to be moved or arranged. As set forth, the selection of the graphic segment to be moved or arranged is performed by selecting one of the preset graphic segments corresponding to the component or part of the product. When selection of one of the graphic segments is completed at the step S2, the data including identification data, the configuration data, the dimension data, cursor position data and so forth of the selected graphic segment are fed to the data receiving stage 211. This data may be stored in a buffer in the data receiving stage 211. Then, at a step S3, the entry demand is generated at the data receiving section 211 for enabling to read out position of data of the graphic segment to be arranged. In practice, the position and orientation of the graphic segment are determined by moving the image of the graphic segment on the display screen of the graphic display unit 22 by operation of the mouse 23. The data for the position and orientation of the graphic segment may be given as coordinate data of the cursor points of the graphic segment. In addition, when the graphic segment is appropriately located without interference, the data entry completion signal and the termination command for terminating the data entry process of the graphic segment is entered through the mouse 23 by pushing a button thereon. As set forth above, the entry demand is generated for periodically reading out the coordinate data of the graphic segments.

At a step S4, the coordinate data of the graphic segment or the termination command is read out. Then, at a step S5, a check is performed to determine whether the termination command has been entered or not. When entry of the termination command is detected at the step S5, the process goes to a step S6 to determine whether or not the process for arranging all of the graphic segments has been completed by comparing the position of the cursor with a reference position. If the decision at the step S6 is YES, then the process ends. If the decision at the step S6 is NO, the data for the position and orientation of the graphic segment under consideration are updated at a step S10.

On the other hand, when the entered data are only the coordinate data of the graphic segment and the termination command is not entered, the process, with respect to the graphic segment generating state 212, is performed for generating the image of the graphic segment and superimposing the image of the entered graphic section on the images of the formerly arranged graphic segments displayed on the display screen, at a step S7. Therefore, the image of the graphic segment to be arranged is visible on the display screen.

Then, at a step S8, the interference checking process, with respect to the interference checking section 215, is performed. At the step 215, one of the interference data stored in the interference data storage memory 214 are read out in terms of the identification data in the segment design data to define the interference area about the graphic segment to be arranged. At step S8, a check is performed with respect to the interference area and thus defined in relation to the interference areas of respective formerly arranged graphic segments. When overlap of the interference areas is detected, it can be determined that interference is occurring and if overlapping is not detected it can be determined that interference is not occurring. When interference is detected, it is inspected on the display for identifying how and with which of the formerly arranged graphic segments the interference is occurring. By this inspection, it can be determined whether or not the instantaneous position of the graphic segment is the desired position of the designer.

In the case that the occurrence of interference is detected at the step S8, then the alarming command with the identification of the interfering graphic segment is provided at the interference alarming stage 216. Therefore, the interference areas interfering with each other are displayed as shown in FIG. 4. After displaying the interference areas at step S9, the process returns to step S3 for re-arranging the graphic segment.

On the other hand, when no interference is detected at step S8, the process goes to step S3. If the position is the desired position, the button on the mouse is pushed to terminate the process for the selected segment.

It should be noted that, after step S10, the process may be returned to step S1 instead of returning to step S3.

By the precess set forth above, all graphic segments can be arranged without causing interference.

Figure 8:
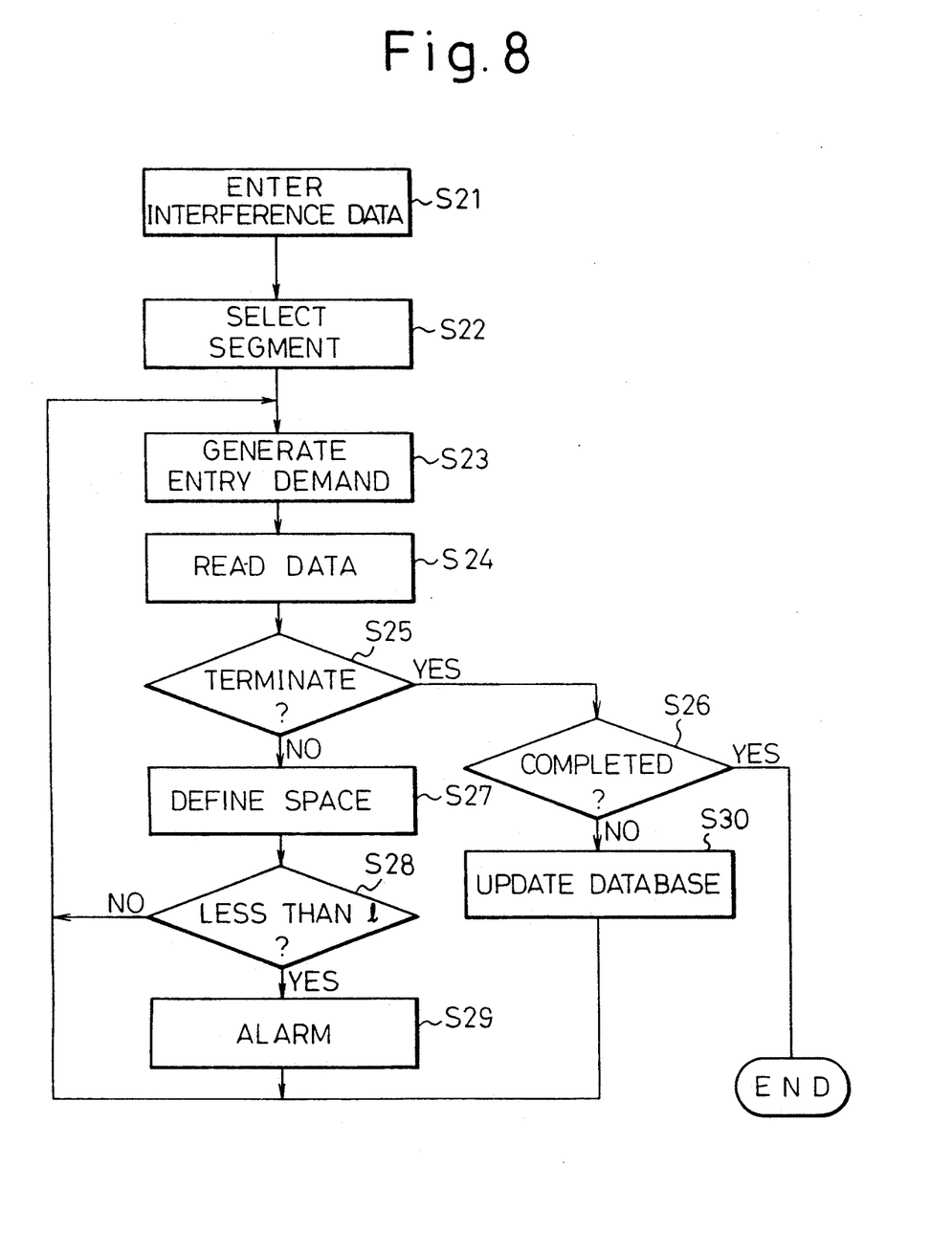
FIG. 8 is a flowchart showing operation, in the another embodiment, of the entry process for orientating each individual graphic segment, in the preferred embodiment of the computer graphic system of FIG. 1.

FIG. 8 shows a flowchart of alternative embodiment of the operation for arranging the graphic segments. In the shown embodiment, the interference data are given as a minimum distance between the neighborhood graphic segments instead of the interference area data. In this embodiment, the minimum distance data 1 as the interference data for all graphic segments to be used in designing are entered and stored in the interference data memory 214 at a step S21. Subsequent processes at steps S22 through S26 are identical to those in steps S2 to S6 in the embodiment of FIG. 7.

At step S27, a border satisfying the minimum distance from the outer contour of the graphic segment is defined based on interference data read out from the interference data memory 214 with identification data in the segment design data.

Then, a check is performed to determine whether the border thus defined overlaps with one of the already arranged graphic segments at step S28. The process at step S29 is identical to the process at step S9 in FIG. 7.

Therefore, similar to the embodiment in FIG. 7, arrangement of all graphic segments without causing interference of the components or parts in the actual product, can be done.

While the present invention has been discussed in terms of the preferred embodiment of the invention, the invention can be embodied in various manners and arrangements. It should be understood that all of the embodiments and/or modifications that can be implemented without departing from the principle of the invention, set out in the appended claims, should be regarded as within a scope of the present invention.

For example, though the shown embodiments permit re-arrangement for only the newly arranged graphic segment, it may be possible to permit re-arrangement of the formerly arranged graphic segments. In such a case, the system may be additionally provided with an edit mode operation for enabling the designer to move, not only the newly entered graphic segment, but also the graphic segments with fixed positions. Furthermore, though the shown embodiment has been discussed in terms of arrangement on the two dimensional coordinate system, it should be possible to apply the present invention, for the arrangement of graphic segments, on the three-dimensional coordinate system.

I claim:

1. A system for arranging graphic segments and avoiding interference between graphic segments that are adjacent to each other in a computer graphic representation of the segments, the system comprising:

first means for entering position of data of a graphic segment of known configuration and known physical dimension in a computer graphics coordinate system;

second means for defining a predetermined interference condition with respect to each individual graphic segment;

third means for checking interference of adjacent graphic segments repeatedly at each position of the graphic segment during movement of the graphic segment and producing an interfering condition indicative signal when said interference condition is satisfied; and fourth means, responsive to said interfering condition indicative signal, for generating an alarm to alert the user of an interfering condition.

2. A system as set forth in claim 1, wherein said second means includes a storage means for storing interference condition data and identification data for each graphic segment, so that the interference condition data of a graphic segment to be checked can be read out in terms of the identification data of the checked graphic segment.

3. A system as set forth in claim 1, which further comprises fifth means for storing data associated with each graphic segment; said data, as stored in said means for storing, including said predetermined interference condition set therefor.

4. A system as set forth in claim 1, wherein said second means defines a minimum spacing between adjacent graphic segments as said predetermined interference condition.

5. A system as set forth in claim 4, wherein said second means defines an interference area around the corresponding graphic segments so that an interfering condition is determined by a detection of overlapping between adjacent interference areas of the adjacent graphic segments.

6. A system as set forth in claim 4, wherein said second means defines a minimum distance between borders of adjacent graphic segments.

7. A system as set forth in claim 1, wherein said fourth means provides an alarm by visually displaying an interfering condition on a display screen together with the graphic segments.

8. A system as set forth in claim 1, wherein said fourth means generates an audible alarm.

9. The system of claim 1 wherein said fourth means for generating an alarm is comprised of means for visually displaying interference areas on a display screen in response to said interfering indicative signal.

10. A system for arranging graphic segments representative of components or parts for performing a desired operation of a product to be designed and avoiding interference between adjacent components or parts in operation of the product, the system comprising:
   first means for entering positional data of a graphic segment of known configuration and known physical dimension in a computer graphics coordinate system;
   second means for defining a predetermined interference condition with respect to each individual graphic segment in view of an operation of the component or parts represented by the graphical segment;
   third means for checking interference of adjacent graphic segments repeatedly at each position of the graphic segment during movement of the graphic segment, and producing an interfering condition indicative signal when said interference condition is satisfied; and
   fourth means, responsive to said interfering condition indicative signal, for generating an alarm to alert the user of an interfering condition.

11. A system as set forth in claim 10, wherein said second means includes a storage means for storing interference condition data and identification data for each graphic segment so that the interference condition data of a graphic segment to be checked can be read out in terms of that graphic segment.

12. A system as set forth in claim 10, which further comprises a fifth means which stores data associated with each graphic segment; data stored in said fifth means including said predetermined interference condition set therefor.

13. A system as set forth in claim 10, wherein said second means defines a minimum spacing between adjacent graphic segments as said predetermined interference condition; the minimum spacing of which is determined in view of the minimum spacing required for an operation of the corresponding component or part in the actual product.

14. A system as set forth in claim 13, wherein said second means defines interference areas around corresponding graphic segments so that an interfering condition is detected as the overlap of the interference areas of adjacent graphic segments.

15. A system as set forth in claim 13, wherein said second means defines a minimum distance between borders of adjacent graphic segments.

16. A system as set forth in claim 10, wherein said fourth means provides an alarm by visually displaying an interfering condition on a display screen together with the graphic segments.

17. A system as set forth in claim 10, wherein said fourth means generates an audible alarm.

18. In a computer graphic system for arranging graphic segments representative of components or parts for performing a desired operation of a product to be designed and avoiding interference between adjacent components or parts in an operation of the product; a process of arranging the graphic segments comprising the steps of:
   entering data defining a position of a graphic segment representative of a product or component of known configuration and known physical dimension in a computer graphics coordinate system;
   defining a predetermined positional relationship of each individual graphic segment relative to adjacent graphic segments in view of an intended operation of the component or parts that the graphic segment represents;
   checking a positional relationship between graphic segments repeatedly at each position of the graphic segment during movement of the graphic segment, and producing an interfering condition indicative signal when interference between a positional relationship of adjacent graphic segments is detected;
   generating an alarm to alert the user of an interfering condition and requiring re-arrangement of at least one graphic segment.

19. A process as set forth in claim 18, wherein said processing is performed periodically with a short internal.

20. A process as set forth in claim 18, wherein said alarm is provided with information about an interfering condition between the graphic segments.

* * * * *

UNITED STATES PATENT AND TRADEMARK OFFICE
CERTIFICATE OF CORRECTION

PATENT NO. : 5,268,997
DATED : December 7, 1993
INVENTOR(S) : Funaki

It is certified that error appears in the above-indentified patent and that said Letters Patent is hereby corrected as shown below:

Column 7, line 9, delete "33" and insert --333--.

Signed and Sealed this

Fourth Day of April, 1995

Attest:

BRUCE LEHMAN

*Attesting Officer*  *Commissioner of Patents and Trademarks*